(12) United States Patent
Mullen et al.

(10) Patent No.: US 8,622,309 B1
(45) Date of Patent: Jan. 7, 2014

(54) PAYMENT CARDS AND DEVICES WITH BUDGETS, PARENTAL CONTROLS, AND VIRTUAL ACCOUNTS

(75) Inventors: Jeffrey D. Mullen, Pittsburgh, PA (US); Philip W. Yen, Cupertino, CA (US)

(73) Assignee: Dynamics Inc., Pittsburgh, PA (US)

( * ) Notice: Subject to any disclaimer, the term of this patent is extended or adjusted under 35 U.S.C. 154(b) by 719 days.

(21) Appl. No.: 12/754,553

(22) Filed: Apr. 5, 2010

Related U.S. Application Data

(60) Provisional application No. 61/166,788, filed on Apr. 6, 2009.

(51) Int. Cl.
*G06K 19/06* (2006.01)

(52) U.S. Cl.
USPC .......................................................... 235/492

(58) Field of Classification Search
USPC .......... 235/492, 379, 375, 493, 486, 487, 380
See application file for complete search history.

(56) References Cited

U.S. PATENT DOCUMENTS

| | | | |
|---|---|---|---|
| 4,353,064 A | 10/1982 | Stamm | |
| 4,394,654 A | 7/1983 | Hofmann-Cerfontaine | |
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

English translation of JP 05210770 A.

(Continued)

*Primary Examiner* — Thien M Le

(57) ABSTRACT

A payment card is provided with a display. A user may enter budget amounts and budget expiration dates into a card. Such information may be communicated via a dynamic magnetic stripe communications device such that future purchases adhere to the budget amount and budget expiration date attributes set by a user. Users may set budget information for other users. For example, a parent may set budget information for a child.

15 Claims, 14 Drawing Sheets

(56) References Cited

U.S. PATENT DOCUMENTS

| | | |
|---|---|---|
| 5,623,552 A | 4/1997 | Lane |
| 5,657,388 A | 8/1997 | Weiss |
| 5,748,737 A * | 5/1998 | Daggar .................... 705/41 |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 * | 1/2007 | Blossom .................... 235/492 |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparinl et al. |
| 7,356,696 B1 | 4/2008 | Jakobsson et al. |
| 7,357,319 B1 | 4/2008 | Liu et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 8,074,877 B2 * | 12/2011 | Mullen et al. .................. 235/380 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sahota et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 * | 5/2006 | Zellner et al. .................. 235/492 |
| 2006/0161435 A1 | 7/2006 | Atef et al. |

(56) References Cited

U.S. PATENT DOCUMENTS

| | | |
|---|---|---|
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1* | 2/2007 | Poidomani et al. ........... 235/492 |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0290049 A1* | 12/2007 | Ratcliffe ....................... 235/492 |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0150295 A1 | 6/2009 | Hatch et al. |
| 2009/0152365 A1 | 6/2009 | Li et al. |
| 2009/0159697 A1* | 6/2009 | Mullen et al. ................. 235/493 |
| 2009/0164380 A1* | 6/2009 | Brown ............................ 705/65 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues. html?issue=37&id=6#article. As viewed on Apr. 12, 2010.
Dynamic Virtual Credit Card Numbers. http://homes.cerias.purdue. edu/~jtli/paper/fc07.pdf. As viewed on Apr. 12, 2010.

* cited by examiner

PAYMENT CARDS AND DEVICES WITH BUDGETS, PARENTAL CONTROLS, AND VIRTUAL ACCOUNTS

CROSS-REFERENCE TO RELATED APPLICATIONS

This application claims the benefit of U.S. Provisional Patent Application No. 61/166,788, filed on Apr. 6, 2009, titled "Payment Cards and Devices with Budgets, Parental Controls, and Virtual Accounts," which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, compute vision equipment such as barcode readers may be less acceptable to errors in reading a displayed barcode.

A user may set budgets for a card for himself/herself or other users. Accordingly, a user may set debit and/or credit limits. For example, a parent may set a spending limit for a child or multiple spending limits for multiple children. An employer may utilize such the card to control, for example, the spending limit of an employee or multiple spending limits of multiple employees. Spending limits may be based on time (e.g., daily limits, weekly limits, and monthly limits).

An unlocking code may be entered into a card in order to change the attributes of a spending limit. For example, a parent may enter an unlocking code into a card in order to change a particular child's daily spending limit. A card may include multiple sources of light (e.g., LEDs) to identify the account whose spending limit a parent (or other individual) is in the process of changing.

The spending limit may be communicated through a dynamic magnetic stripe communications device (e.g., a magnetic stripe encoder or a magnetic stripe emulator) every time the card is used. Such a spending limit may also be communicated through other communication devices (e.g., an exposed IC chip and/or an RFID). Accordingly, a remote server may update spending limit information for a particular account based on this received information. In doing so, the remote server may govern the authorization of spending associated with that account's spending limit.

A user (e.g., a parent or employer) may also set spending limits online via a webpage for a card or group of cards. The user (e.g., the parent or employer) then may, for example, activate a card for a different user (e.g., a child or employee) by utilizing a proper unlocking code. Similarly, a user may also set spending exceptions online via a webpage. For example, a user may allow for particular types of purchases (e.g., gas and food) to be excluded from spending totals for a period of time. The server that receives such information from such a webpage may communicate with an authorization server such that the authorization server is made aware of spending rules (e.g., spending limits).

Rule changes (e.g., that particular types of goods are exempt from spending limits) may also be made on either a card (e.g., via buttons) or a graphical user interface of a device (e.g., via a mobile telephone or laptop computer). Such rule changes may be communicated from the card itself to an authorization server (e.g., via a dynamic magnetic stripe communications device, RFID, and/or exposed IC chip) or via another device (e.g., a laptop computer running a browser over the internet or a mobile telephonic device).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
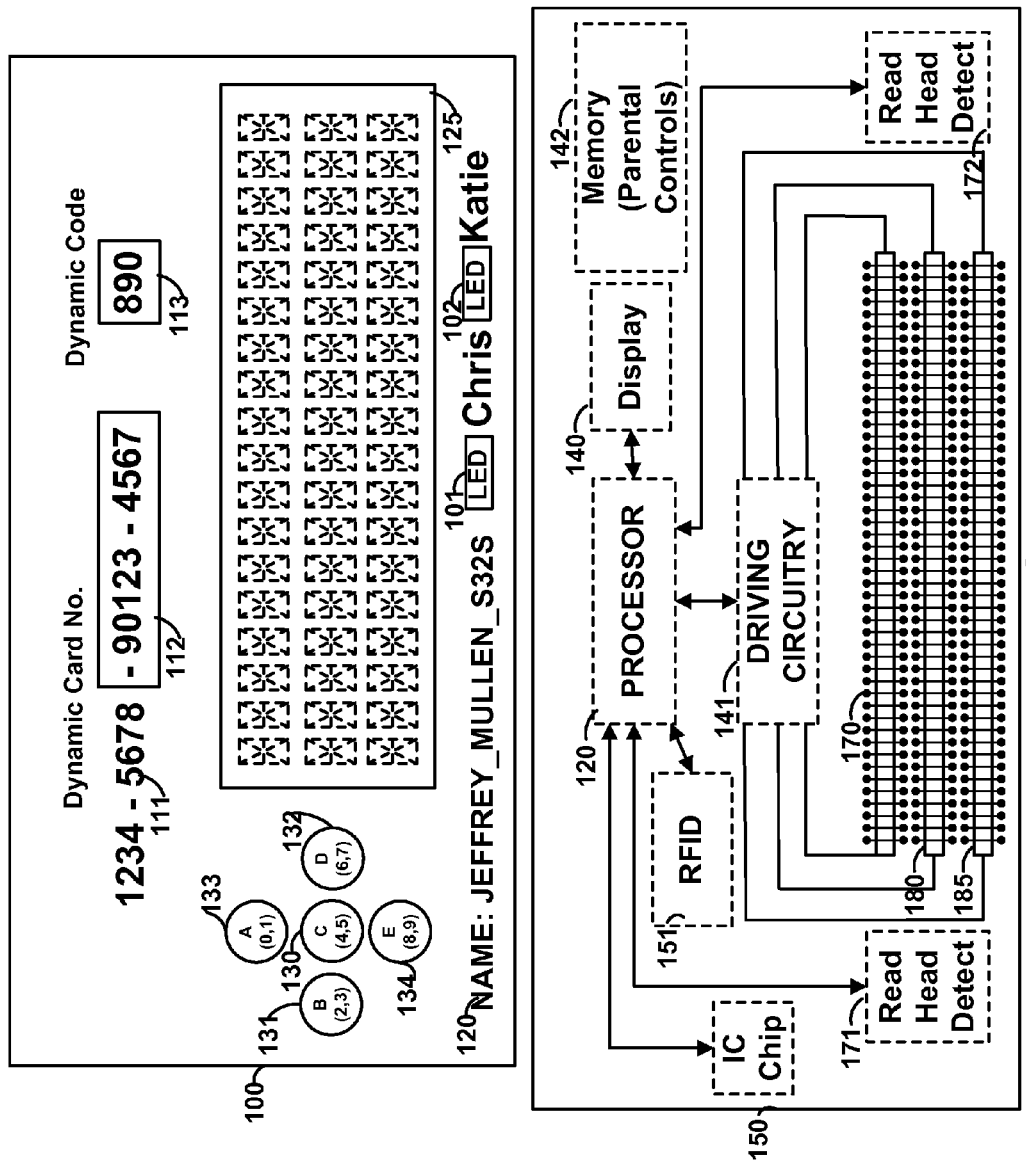
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, or multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 131-134. Such buttons may be mechanical buttons, capacitive buttons, or a combination or mechanical and capacitive buttons. Light sources may be provided on a card (e.g., light sources 101 and 102). Such light sources may correspond to different accounts such that a user of the device is provided with a visual indication of what account is being utilized. For example, a particular source of light may emit light to indicate that the spending limits are being changed for that account. Accordingly, for example, a source of light may identify the account associated with options displayed on a card (e.g., via a display) and manual input interfaces capable of receiving manual input (e.g., via buttons).

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may include a user-specific and card-specific data for multiple payment accounts (e.g., name, account number, parental control preferences, and/or budget thresholds). In turn, for example, memory 142 may include data for one user's credit account (e.g., a parent) and a different user's pre-paid debit account (e.g., a child).

Any number of reader communication devices may be included in architecture 150. For example, IC chip 150 may be included to communicate information to an IC chip reader. IC chip 150 may be, for example, an EMV chip. As per another example, RFID 150 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 150, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
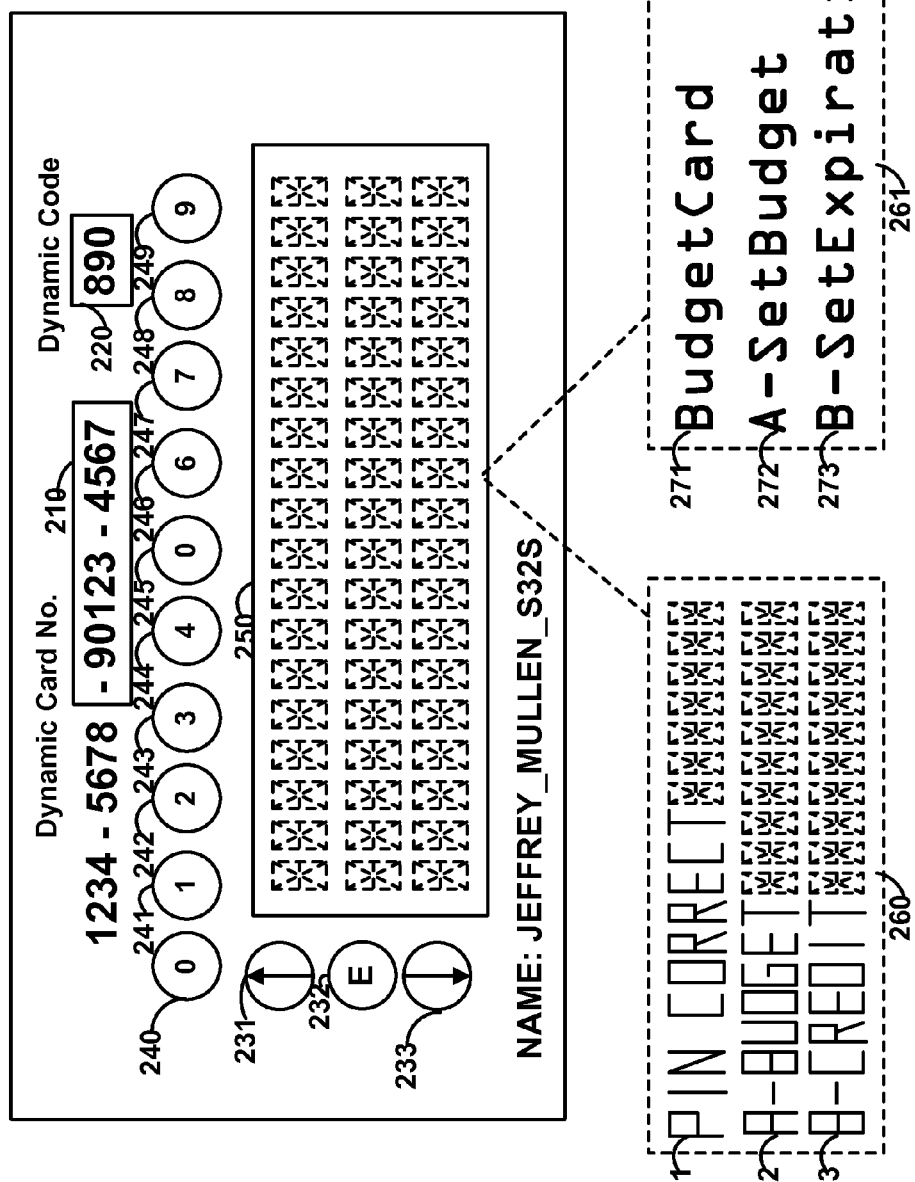
FIG. 2 is an illustration of a card constructed in accordance with the principles of the present invention.

FIG. 2 shows card 200. Card 200 may include manual input interfaces 240-249. Each one of manual input interfaces 240-249 may include indicia indicative of the type of input associated to the particular manual input interface. For example, manual input interfaces 240-249 may each include indicia representative of a digit and/or letter. Manual input interfaces 231, 232, and 233 may also be included. Manual input interfaces 231 and 233 may be utilized to, for example, scroll through options on display 250 while 232 may be utilized to select a particular option.

Graphical User Interface (GUI) 260 may be displayed via a display (e.g., display 250 of card 200). Any number of lines of information may be provided to a user. For example, three lines of information may be provided to a user. Furthering this example, line 261 may display information indicative of a type of user selection. Lines 262 and 263 may each include a single selection for a user or multiple selections for a user. A user may then utilize manual input interfaces 240-249 to select a particular option. Also, for example, a user may utilize manual input interfaces 231 and 233 to toggle between selections and manual input interface 230 to select a selection. Persons skilled in the art will appreciate that a selection may be graphically highlighted. For example, the color of the information may change, the font of the information may change, and/or the size of the information may change. Similarly, for example, the background of the information may change colors or display different indicia (e.g., photographs or graphical patterns). A bi-stable display may, for example, inverse the background and displayed information such that a highlighted selection inverses the colors of the background and the information. In doing so, particular features may be displayed with a background of one particular color (e.g., white or green) and information in a different color (e.g., black or blue) and other features may utilize the background as the different color (e.g., black or blue) and the information as the particular color (e.g., white or green).

Information 261 may, for example, display information representative of receiving a correct unlocking code by a user. More particularly, for example, a card may operate in a low-power mode and not provide particular functionality until an appropriate unlocking code is entered in by a user. An unlocking code may take any form. For example, an unlocking code may take the form of a particular combination of manual input via manual input interfaces 240-249. For example, if each of manual input interfaces 240-249 includes indicia representative of a particular digit, an unlocking code for a user may take the form of "12345." The entrance of a proper unlocking code may cause a processor of card 200 to display GUI 260 on a display. A proper unlocking code may, for example, switch the colors utilized for a background and displayed information. In doing so, for example, a user may determine whether the card is unlocked simply by viewing the colors of a display's information (e.g., text) and background.

Information 262 may be indicative of a user option to select a budget that the user assigned to himself/herself or a budget that was assigned to the user by a third party (e.g., a parent or employer). A budget, for example, may be associated with a particular type of payment. For example, a budget may be associated with a debit account. Accordingly, a purchase on the budget account may directly remove money from a particular bank account. Information 263 may include, for example, information indicative of a user option to select a particular type of payment account without a budget. For example, information 263 may include an option for a user to select a credit account. Additional types of payment may include, for example, pre-paid, gift, points, miles, decoupled debit, or any other type of payment account. For example, a user may select a points payment account and may pay for items at a point-of-sale (e.g., or online) using points from the user's points balance. Accordingly, for example, a user may set rules for how the user may spend points (e.g., by setting a point spending limit for a particular amount of time or a particular type of transaction).

A number of events may occur when a user goes over a budget. A purchase transaction may, for example, be declined. Accordingly, a user may, for example, have to select a different payment account (e.g., a credit account) and retry a transaction using that account. Alternatively, for example, the authorization system may split the transaction into two transactions. Particularly, an authorization system may authorize a transaction for an account associated with a budget up to that budgeted amount. The remaining amount may then be budgeted to a different account (e.g., a credit account). In doing so, for example, a transaction may still be authorized even if a budget is exceeded.

Persons skilled in the art will appreciate that a user may change a budget on-card without notifying a bank via the phone or a website. GUI 261 may be utilized by a user to set a budget on a card. For example, a user (e.g., a parent or user) may enter an unlocking code into a card to identify the user as one operable of setting a budget (or providing another spending rule). That user may then set a budget for the card or a particular account. Information 271 may be displayed in order to prompt a user of the types of options on GUI 261. Information 272 may be an option for a user to select, such as an option for a user to set a particular budget amount. Information 273 may also be an option for a user to select, such as an option for a user to set a particular amount of time before the budget expires (e.g., within 24 hours). An option may also be provided to allow a user to define when a budget resets. In doing so, a period may be associated with a budget (e.g., weekly, monthly, etc.).

Figure 3:
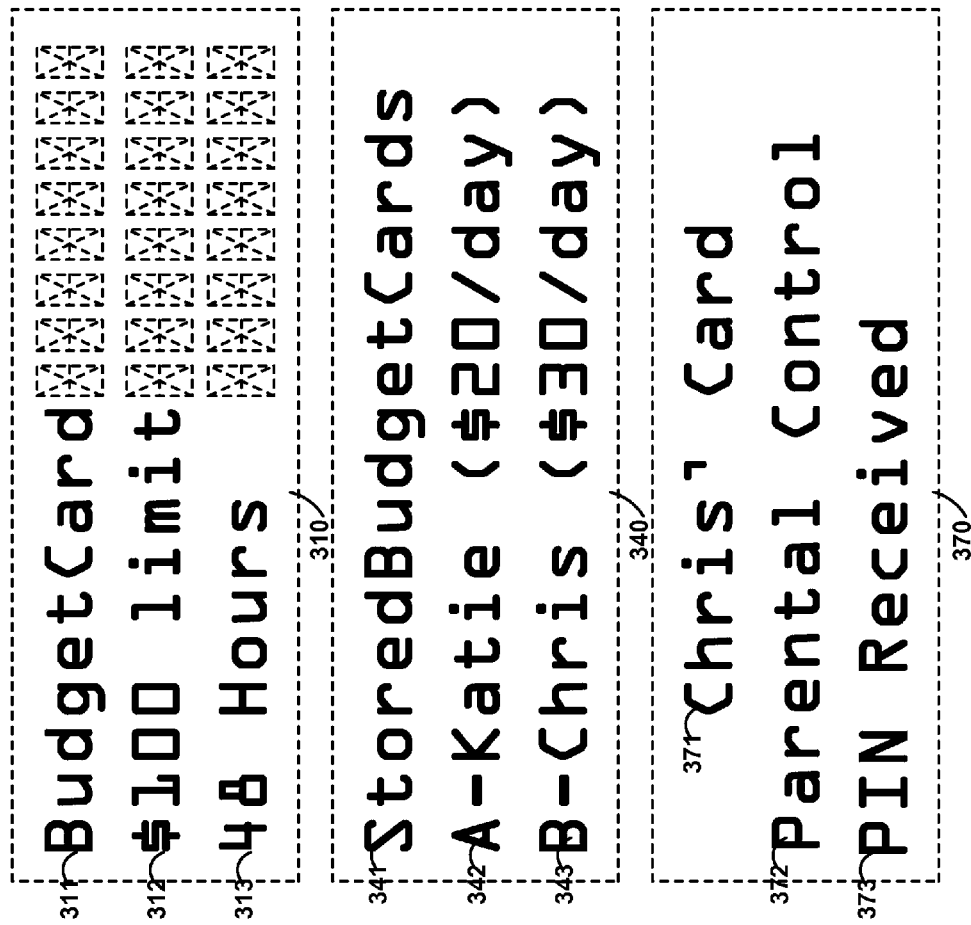
FIG. 3 is an illustration of display screens for a card constructed in accordance with the principles of the present invention.

FIG. 3 shows GUI 310. GUI 310 may be utilized, for example, to display a user's selection for a budget. Information 311 may include display information indicative of the mode associated with the user selections. Information 312 may be included and may be indicative of the budget limit for a user. Such a budget limit may be a set amount of money or a percentage of a particular amount. By utilizing percentages, for example, a user may allocate different percentages for different types of purchases or among different users (e.g., employees). For example, a user may include one spending limit for groceries and another spending limit for gas. Information 313 may be included and may be indicative of the time duration of the budget. When time expires for a budget, for example, the budget may reset, the budget may be removed, or the budget may set to zero such that no further purchases can be made using the card. Persons skilled in the art will appreciate that budgets may be set for a particular number of purchases. Accordingly, for example, a parent may provide a card to a child with the instructions that the child may use the card a particular number of times (e.g., twice). In doing so, for example, the parent may not desire to set a limit to the amount of purchases, just the number of purchases. For example, if the parent is providing a card to a child for dinner and a movie, the parent may provide the child with the ability to use the card twice. Persons skilled in the art will also appreciate that a card may include a visual aid (e.g., a source of light or indicia on a display) to display that a particular user of the card (e.g., a card's administrator) has authorized a particular user to use the card. For example, the display may include indicia stating "Jeffrey Mullen has authorized Philip Yen to use this card." In doing so, for example, a cashier or waiter may recognize that a card's use is properly authorized.

GUI 340 may be utilized to select between different users such that budgets may be set for each user. Alternatively, for example, GUI 340 may be utilized to select between predetermined budget cards. For example, a user may store budget cards for multiple users (e.g., multiple children). Accordingly, a user may unlock a card, select another user, and then provide their card to that other user for use. In this manner, a parent may drop off a child at a movie theater, select that child on GUI 341 to retrieve a budget for that child, and then give the child the card. GUI 340 may, for example, reset a budget. For example, suppose a parent selects an option associated with information 342 for the user "Katie." Suppose this budget provides a daily budget of $20. If the parent received the card back from the user "Katie" six hours after giving the user "Katie" the card, the parent may enter in an unlocking code, enter manual input instructing the card to display the stored budgets, and then select an option associated with information 343 for user "Chris." Suppose this budget provides a daily budget of $30/day. The selection of an option associated with set 343 may be utilized to reset the amount under the budget to $0 so that any money the user "Katie" spent would not reduce the budget of the user "Chris." Accordingly, for example, one or more communications devices to (e.g., an RFID, magnetic stripe communications device, and/or IC chip) may communicate budget information to a user with every transaction. More generally, a communications device may communicate information indicative of user selections into a card in addition to payment information (e.g., credit card account number and associated discretionary data for authorizing a purchase transaction). Such information may be communicated in, for example, discretionary data fields not associated with those for authorizing a purchase transaction. The information may include, for example, the budget as well as information indicative of how to deploy the budget. For example, information may be included indicative of a budget amount and a budget reset (e.g., if changing between user "Katie" and user "Chris"). Alternatively, for example, information may be included indicative of a budget amount and a budget modification (e.g., if a user changes a budget from $100 to $200).

A display may be provided on a card to display such discretionary data. This discretionary data may be entered online at the time of a purchase. For example, multiple security codes may be displayed. Each security code may be utilized to authenticate a transaction. However, each different security code may be associated to different budget data. In this way, for example, budget information may be communicated through transactions that are performed online or over the phone.

GUI 370 may be included in a card. For example, a user may carry around a card that can have attributes modified by a third party (e.g., a parent). Accordingly, GUI 370 may be utilized for that third party user to identify themselves (e.g., information 373) and set controls (e.g., information 372) for a card (e.g., card 371). Persons skilled in the art will appreciate that a card may have multiple accounts associated with it and that GUI 370 may be utilized for a particular account.

Figure 4:
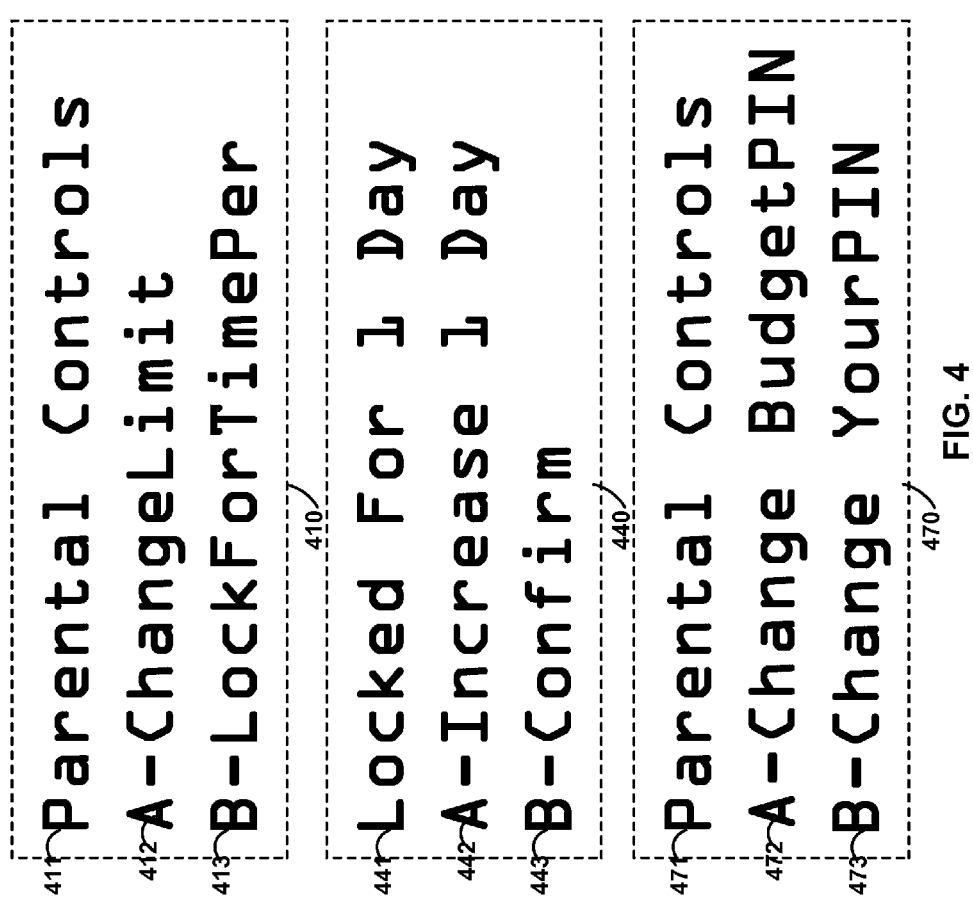
FIG. 4 is an illustration of display screens for a card constructed in accordance with the principles of the present invention.

FIG. 4 includes GUI 410. GUI 400 may be initiated by a processor of a card, for example, to provide parental controls (or other controls such as employer controls) for a card. Such controls may, for example, change the limit of a card (e.g., information 412) as well as lock-in the decisions for a period of time (e.g., information 413) or until an event occurs (e.g., a particular number of purchases have been made).

GUI 440 may be included to allow a user to increase or decrease the amounts of particular selections. By including GUI 440, for example, a card may include two or three buttons, but may be able to set values for selections. Accordingly, GUI 440 may include an option (represented as information 442) for a user to increase a value by a particular unit (e.g., a dollar, ten dollars, one-hundred dollars, one hour, one day, one week). An option (represented as information 443) may be utilized for a user to confirm the amount chosen. Information 441 may be utilized to display the current amount selected.

GUI 470 may be included. Information 471-473 may be included in order to allow a user to change an unlocking code to alter the card as well as a different unlocking code for changing a budget. Persons skilled in the art will appreciate that a user (e.g., one parent) may provide a different unlocking code to a different user (e.g., the other parent) such that multiple people can change attributes of a card. Alternatively, for example, a child may be assigned his/her unlocking code such that multiple people can utilize the same card (e.g., multiple children) and each have their own budgets with that card. Information indicative of the user of the card at the time a purchase is made (e.g., a user's identity) may be communicated through a communications device to a reader or may be displayed on a display (e.g., for online use).

Figure 5:
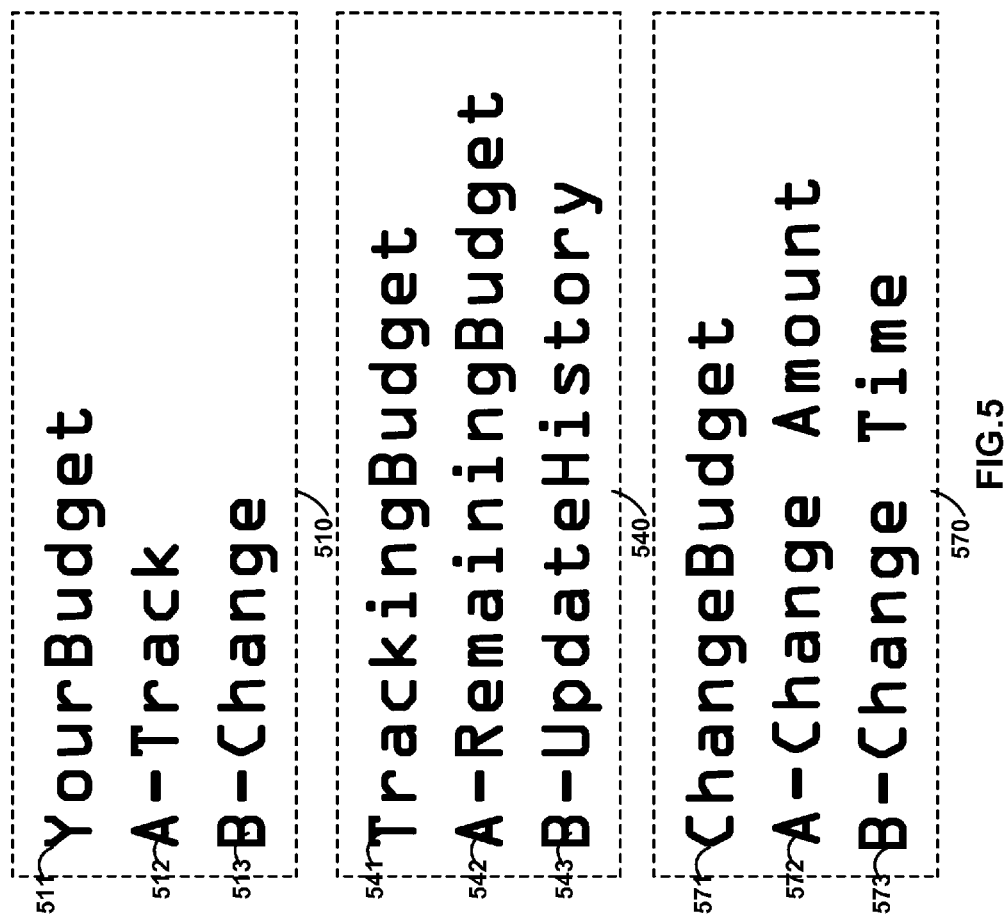
FIG. 5 is an illustration of display screens for a card constructed in accordance with the principles of the present invention.

FIG. 5 may include GUI 510. GUI 510 may include information 511 indicative of, for example, a particular user's budget. Information 512 may be, for example, indicative of an option to track a budget while information 513 may be indicative of an option to change a budget. Persons skilled in the art will appreciate that any displayed GUI may be displayed, for example, on a touch-screen such as a capacitive touch screen. Accordingly, for example, a user may select an option by pressing the associated information on a touch-sensitive screen.

Persons skilled in the art will also appreciate that a card may receive information from a card reader. For example, an electromagnetic generator may be formed from a coil. A reader that includes a magnetic stripe encoder may generate electromagnetic fields that may, for example, be received as communication signals by this coil. Accordingly, the card may receive information from a magnetic stripe reader. Additionally, an RFID may receive information from an RFID reader and an IC chip may receive information from an IC chip reader. Information may also be received in a variety of other ways. For example, a light sensor may receive light pulses, indicative of information, from a display. Accordingly, information indicative of a user's spending history and/or remaining amount of a budget may be communicated to a card. A user may utilize manual input interfaces to enter information into a card (e.g., how much a user believes he/she has spent out of a budget). Information 541 may display information associated with a user's tracked budget. Information 542 may be associated with an option to display the remaining budget for a particular budget. Information 543 may be associated with an option for a user to update his/her spending history such that an appropriate budget approximation may be obtained.

GUI 570 may be included and may display information 571-573. Such a GUI may allow a user to change an amount for a budget as well as the time the budget is available to a user.

Figure 6:
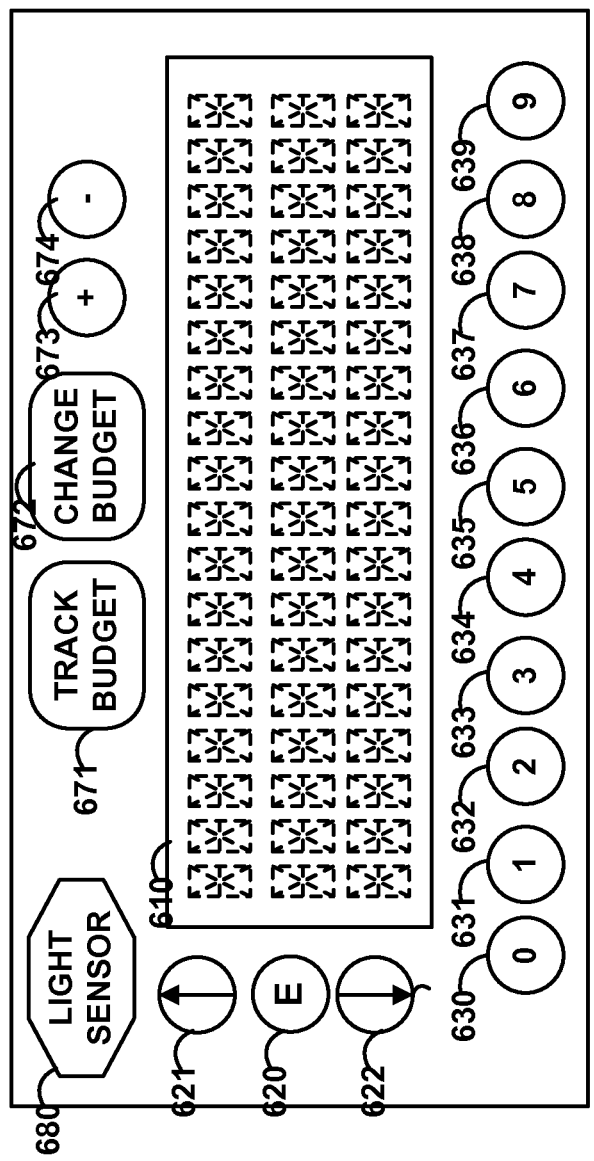
FIG. 6 is an illustration of a card constructed in accordance with the principles of the present invention.

FIG. 6 shows card 600 that may include manual interfaces 630-639, 620-622, 673, 674, 671, and 672. Persons skilled in the art will appreciate that manual interfaces may be dedicated interfaces to a particular function. For example, manual interface 671 may be utilized at any time to initiate budget tracking. Similarly, manual interface 672 may be utilized at any time to initiate the ability for a user to change a budget. Light sensor 680 may be included, for example, to receive information. Particularly, light sensor 680 may receive light pulses from a display (e.g., a computer display or a mobile phone display). Accordingly, information may be loaded into a card without any manual input. This information may be communicated by, for example, a webpage, commercial, movie, or television show. Information that may be communicated may include, for example, types of accounts for a card and any associated unlocking codes or budget information. Transaction history and remaining budget information may also be, for example, communicated to a card via light pulses or other types of communication signals.

A source of light may be included to communicate information to another card or device. Similarly, for example, a magnetic stripe communications device on one card may communicate information to a magnetic stripe communications device on another card. Information sent to another card may include, for example, account information, unlocking code information, as well as budget information. Accordingly, for example, a parent may enter budget information into the parent's card for a child's card and then hold his/her card next to the child's card to communicate budget information (e.g., budget amount and expiration information) to that child's card. Accordingly, a parent's card may be mated with one or more child's cards such that the child's card recognize (e.g., via a handshaking process between the cards) the parent's card and receives instructions from the parent's card. Such a scheme may be beneficial in numerous situations such as, for example, an employer providing a budget to an employee or a school providing a daily budget to a student athlete at an away game.

A display may be operable to display a barcode such that, for example, spending rules may be communicated optically to an optical reader. Accordingly, spending rules may be added to magnetic stripe data (e.g., via discretionary data fields) or may be converted into character information that may be displayed as a barcode. Accordingly, for example, a payment account number (e.g., credit, debit, or points number) and spending rules may be communicated as a barcode to an optical barcode reader (e.g., at a grocery store).

Figure 7:
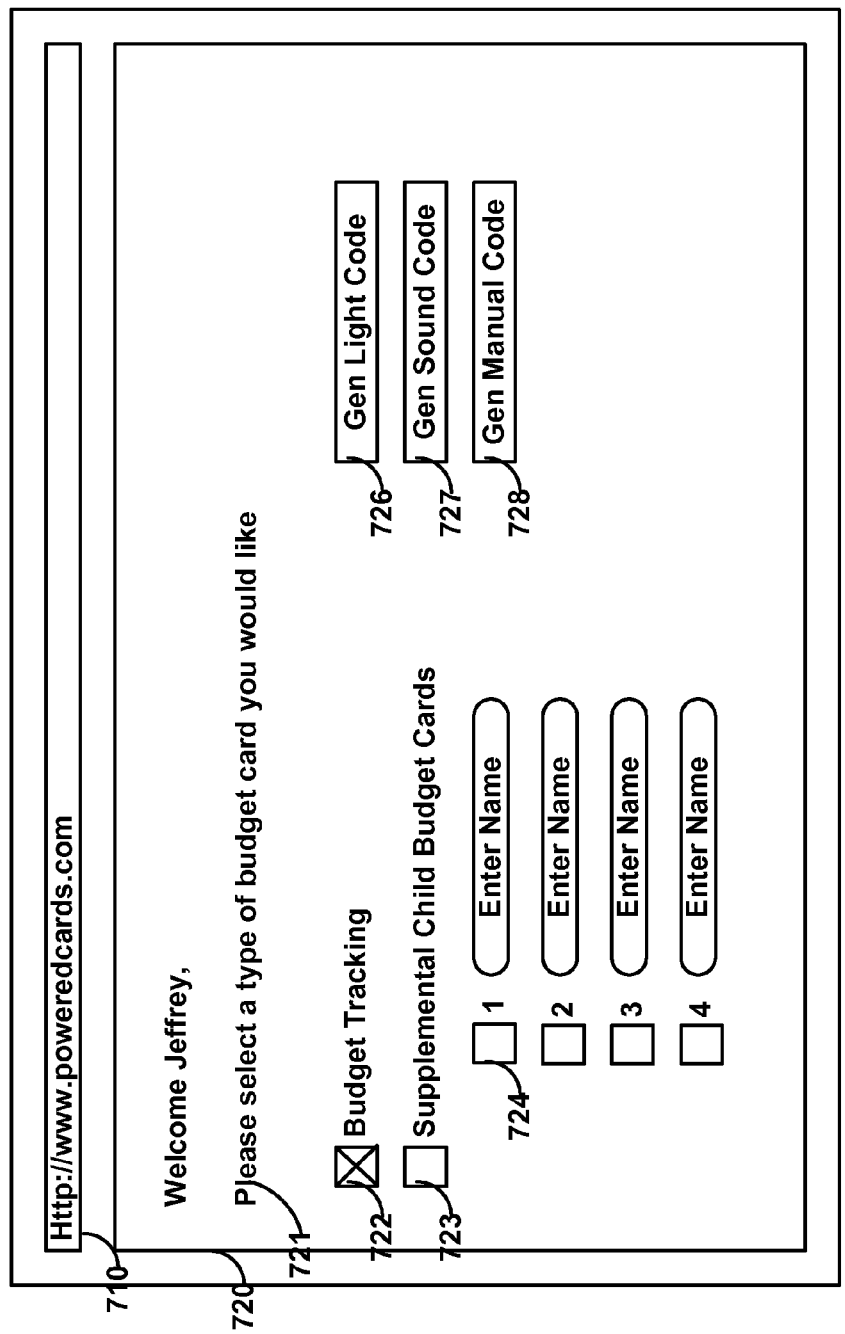
FIG. 7 is an illustration of a website constructed in accordance with the principles of the present invention.

FIG. 7 shows GUI 700. GUI 700 may be displayed on a display of, for example, a laptop, stationary computer, television set, gaming device, or mobile telephonic device. GUI 700 may include, for example, navigational tools 710 and display area 720. Information 721 may be displayed to identify the type of selection options associated with GUI 700. Options 722 and 723 may be included. Option 722 may initiate budget tracking for a particular card. Option 723 may initiate supplemental budget cards for a card. Accordingly, for example, a user may log into a website and find a particular card and change the attributes of that card using GUI 700. For example, a user (e.g., a parent) may utilize option 724 and enter in the name of a supplemental card and additional information (e.g., budget information). Option 726 may be utilized to generate light pulses so a card can receive information via one or more light sensors. Option 727 may be utilized to generate sound (e.g., tones) so that a card can receive information via one or more microphones. Option 728 may be utilized to generate a manual code such that a user can enter information into a card via manual input interfaces. Accordingly, a card may include software to translate a manual code into, for example, budget and supplemental card information.

Figure 8:
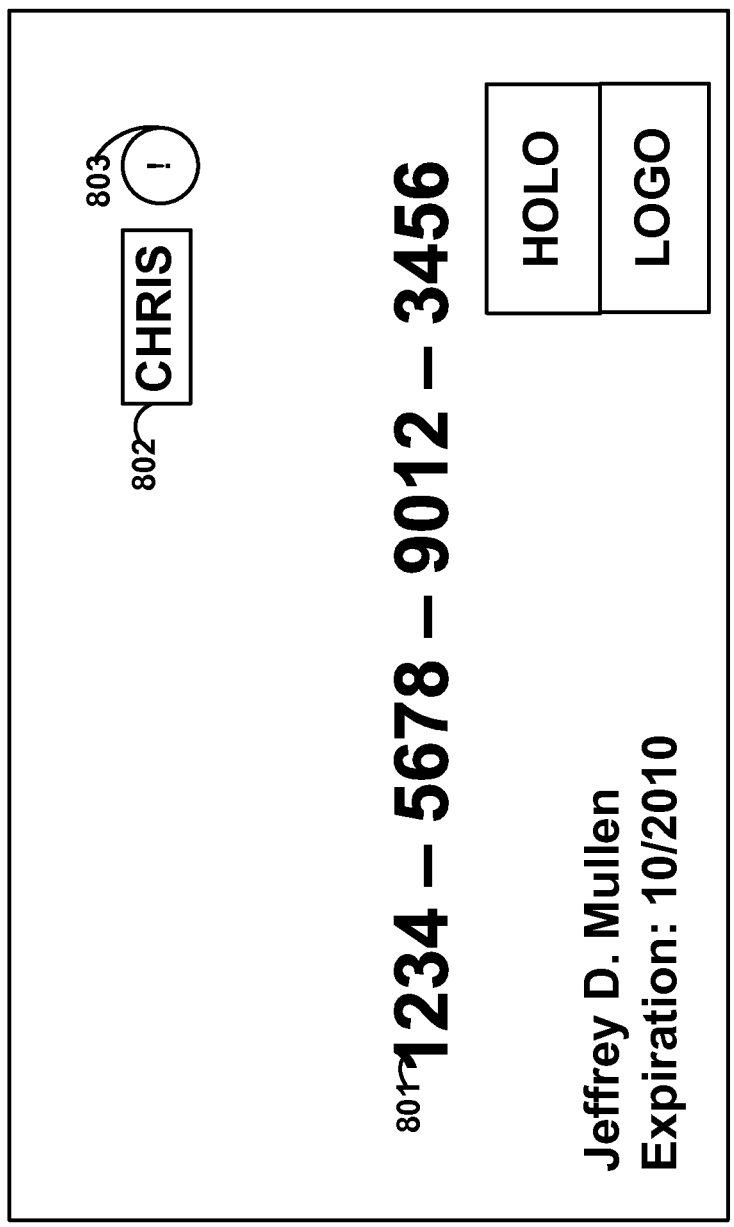
FIG. 8 is an illustration of a card constructed in accordance with the principles of the present invention.

FIG. 8 shows card 800. Card 800 may be, for example, a simplified budget card. For example, a parent may have a card setup for multiple users (e.g., multiple children). A button on the card may switch between the different accounts. Display 802 may display the name of the account selected. A dynamic magnetic communications device may communicate different information for each account (e.g., the same account number and different discretionary data or different account numbers). A budget may be associated with each account.

Figure 9:
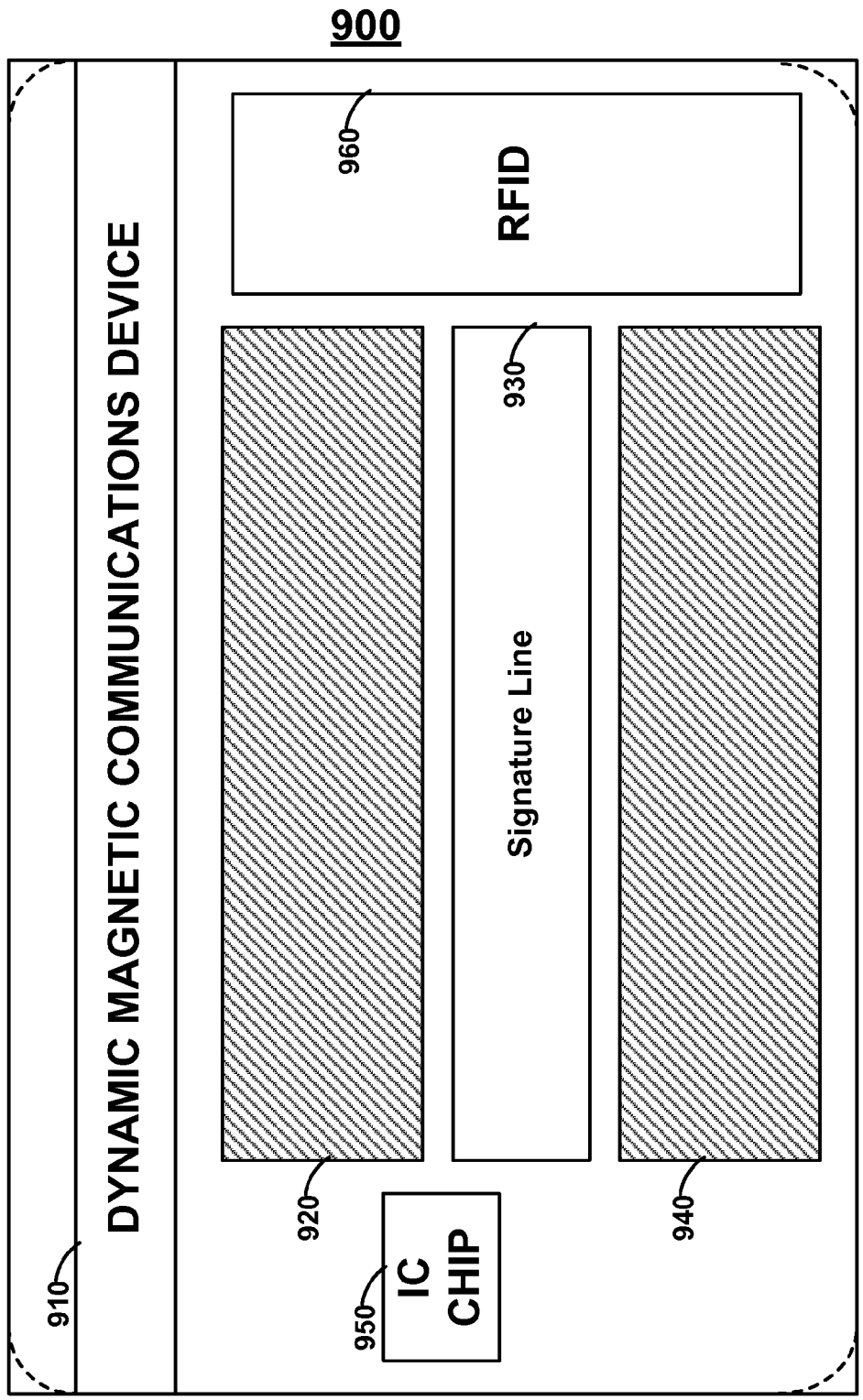
FIG. 9 is an illustration of a card constructed in accordance with the principles of the present invention.

FIG. 9 shows card 900 that may include, for example, branding areas 920 and 940. Branding areas may include, for example, company logos. Signature line 930 may be included. The surface shown on card 900 may be, for example, the reverse side of any card. One or more displays may be provided on such a reverse side. Card 900 may also include, for example, IC chip 950, RFID 960, as well as a magnetic stripe communications device (e.g., one, two, or three electromagnetic generators for communicating individual track information serially to a magnetic stripe reader).

Persons skilled in the art will appreciate that budgets may have exceptions or that particular purchases may not be utilized as part of a budget. For example, emergency purchases or particular types of purchases (e.g., gas and food), may not be included as part of a budget. Additionally, for example, a budget may be provided for different types of transactions (e.g., gas, entertainment, and clothing). A remote server may keep track of all budgets for each type of purchase a user makes on an account utilizing, for example, information about the retailer authorizing a purchase (e.g., a gas station, movie theater, and clothing store). Such spending rules (e.g., budgets and exceptions) may be determined on-card and provided through a communications device (e.g., a magnetic stripe emulator) or may be determined online (e.g., via a website). For example, an issuer may set initial spending rules online and then modify these rules in a store at checkout. Such spending rules may also be set and modified via other devices such as, for example, mobile telephonic devices, ATMs, and cash registers. Additionally, users may set monitoring rules online and modify these monitoring rules in a store at checkout. Accordingly, for example, a user may set budgets online and may receive communications from a server (e.g., SMS text messages or emails) when budgets are exceeded. A user may set particular bill pay options and associate these bill pay options on-card or online. For example, a user may select to automatically pay a bill when a particular budget has been reached.

Figure 10:
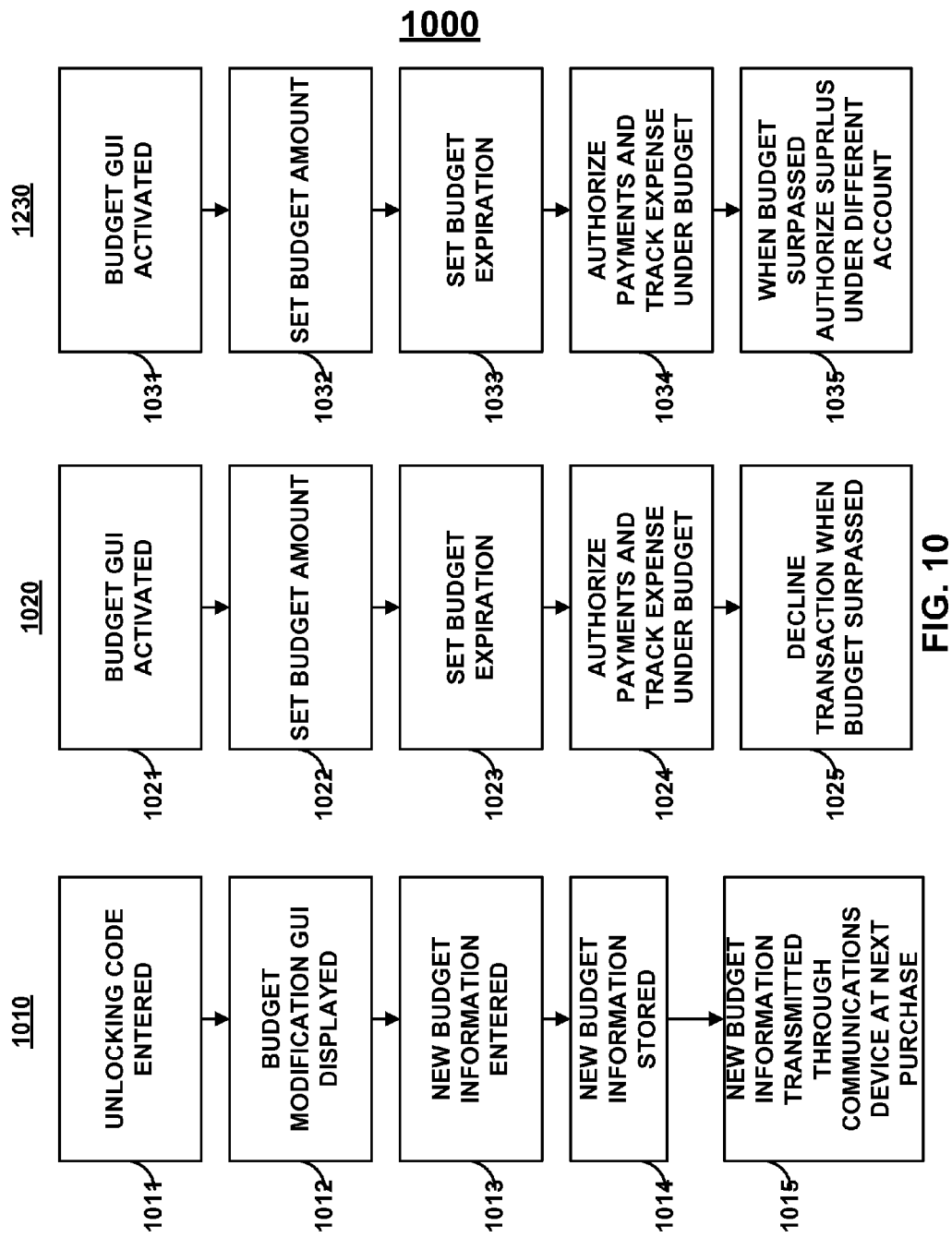
FIG. 10 is a flow chart of processes constructed in accordance with the principles of the present invention.

FIG. 10 includes flow chart 1010 that may include step 1011, in which a user may identify themselves via a proper unlocking code. Step 1012 may be included, in which a GUI for modifying a budget is displayed. Step 1013 may be included, in which new budget information is entered. Such new budget information may then be stored in step 1014 on a card. This new budget information may then be transmitted (e.g., in step 1015) through a communications device to a remote server at the next purchase where a reader is used to receive information from the communications device.

Flow chart 1020 may be utilized in which, for example, a budget GUI is activated in step 1021. Step 1022 may be provided in which an amount of a budget is set. Step 1023 may also be provided, in which timing for the budget (e.g., an expiration) is set. Step 1024 may be provided, in which payments are authorized and expenses are tracked. Step 1025 may be provided, in which transactions are declined when the budget is surpassed by the expenses of a user.

Flow chart 1230 may be utilized and may include, for example, step 1031, in which a budget GUI is activated. Step 1032 may be provided in which an amount of a budget is set. Step 1033 may also be provided, in which timing for the budget (e.g., an expiration) is set. Step 1034 may be provided, in which payments are authorized and expenses are tracked. Step 1035 may be provided, in which transactions are split between multiple accounts when the budget is surpassed by the expenses of a user.

Figure 11:
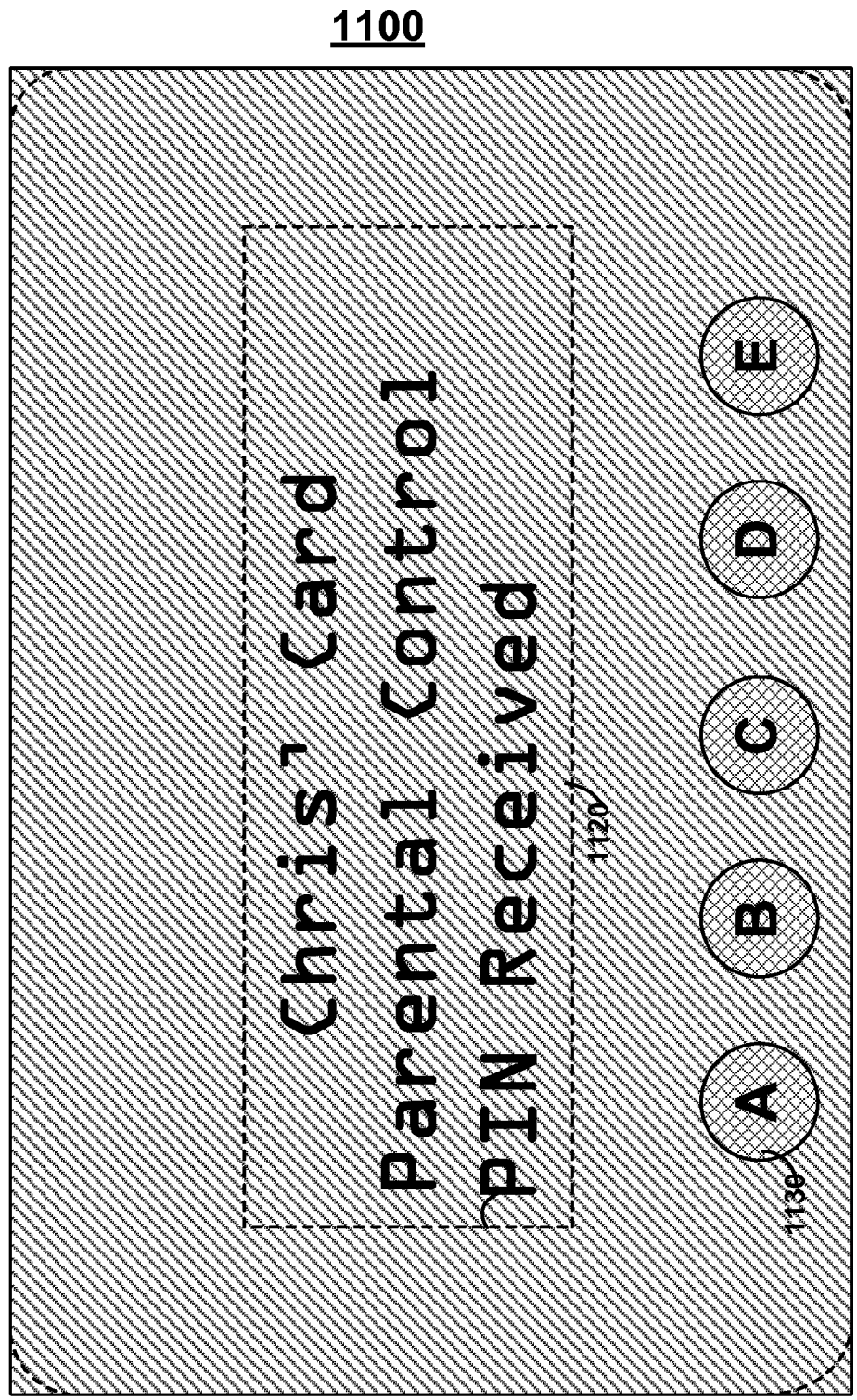
FIG. 11 is an illustration of a card constructed in accordance with the principles of the present invention.

FIG. 11 shows card 1100, which may include a display screen over substantially the entire obverse surface of the card. Persons skilled in the art will appreciate that a display screen may also be placed over substantially the entire reverse surface of the card. One or more batteries (e.g., lithium polymer batters) may be provided to power the card. Such a display screen may be a touch sensitive screen and virtual manual input interfaces (e.g., interface 1130) may be displayed such that a user can provide manual input in the proximity of the virtual manual input interface. Portion 1120 may be provided to display information. Persons skilled in the art will appreciate that portion 1120 may not include any touch-screen ability (e.g., no capacitive-touch sensors may be provided about area 1120).

Figure 12:
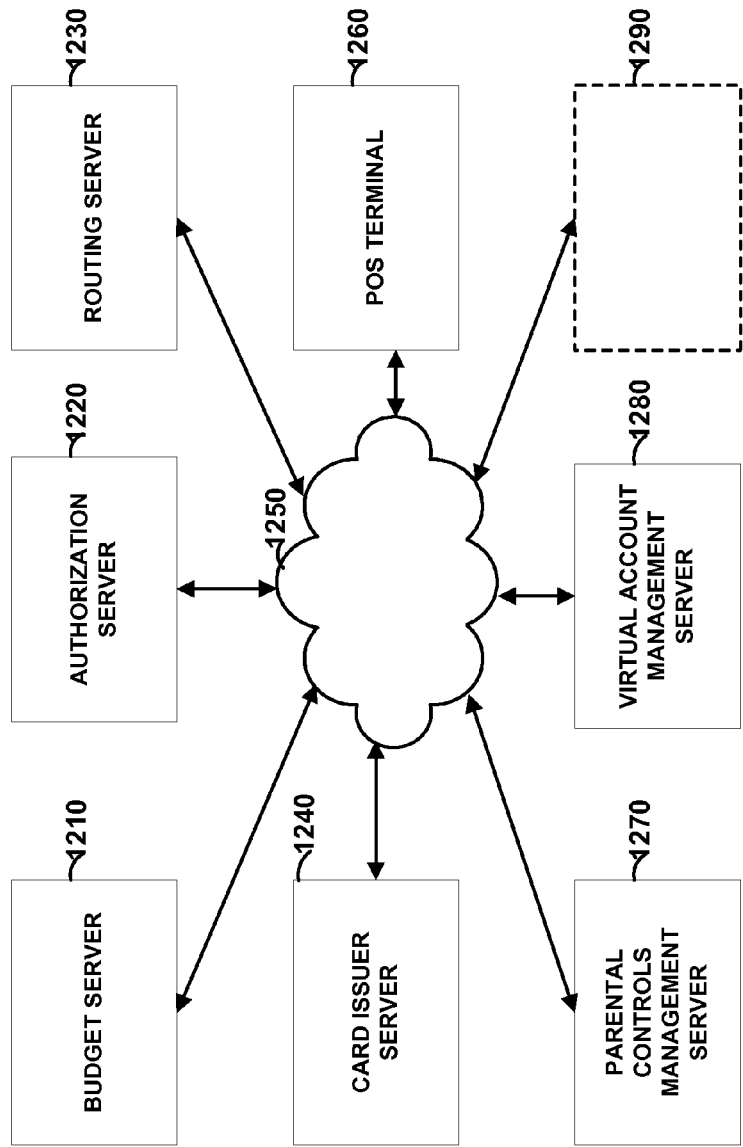
FIG. 12 is an illustration of a network constructed in accordance with the principles of the present invention.

FIG. 12 shows network 1200 that may include, for example, communications network 1250, budget server 1210, authorization server 1220, routing server 1230, card issuing server 1240, point-of-sale terminal 1260, parental controls management server 1270, virtual account management server 1280, and additional remote systems 1290. Additional remote systems 1290 may include, for example, call centers and unlocking code management software. Information regarding a change to spending rules may be, for example, generated on a card, communicated to budget server 1210 while being routed via POS terminal 1260 and routing server 1230. During the same transaction (e.g., the same swipe of a dynamic magnetic stripe communications device), payment account information and associated data may be generated from the card and communicated to authorization server 1220 via POS terminal 1260 routing server 1230. Authorization server 1220 may then communicate, for example, with budget server 1210 to determine budget constraints for the transaction.

Figure 13:
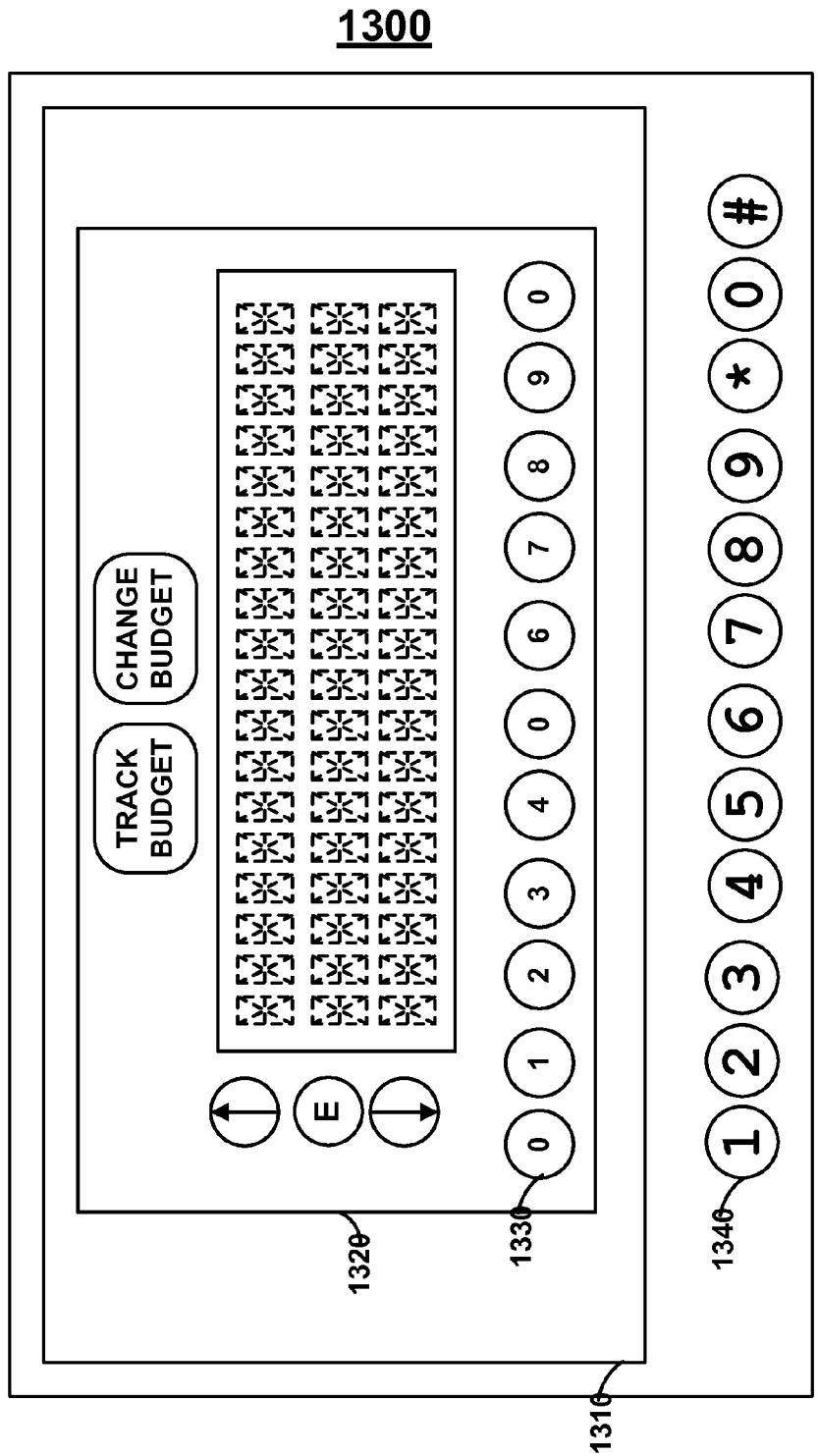
FIG. 13 is an illustration of a virtual card constructed in accordance with the principles of the present invention.

FIG. 13 shows mobile device 1300 that may include display screen 1310 and manual input interface 1340. Virtual card 1320 may be displayed on display screen 1310 and include virtual button 1330 (e.g., display 1310 may be a capacitive touch-screen). Any card discussed herein may be provided as a virtual card and utilized on a mobile device (e.g., a mobile telephonic device). Physical buttons on a card may correspond, for example, to virtual buttons on a display. Information may be communicated, for example, wirelessly from the phone to a point of sale terminal (e.g., via an RFID). Information may be communicated via, for example, a barcode. Information may be communicated through, for example, communication devices of the mobile telephone (e.g., a wireless transmitter/receiver).

Figure 14:
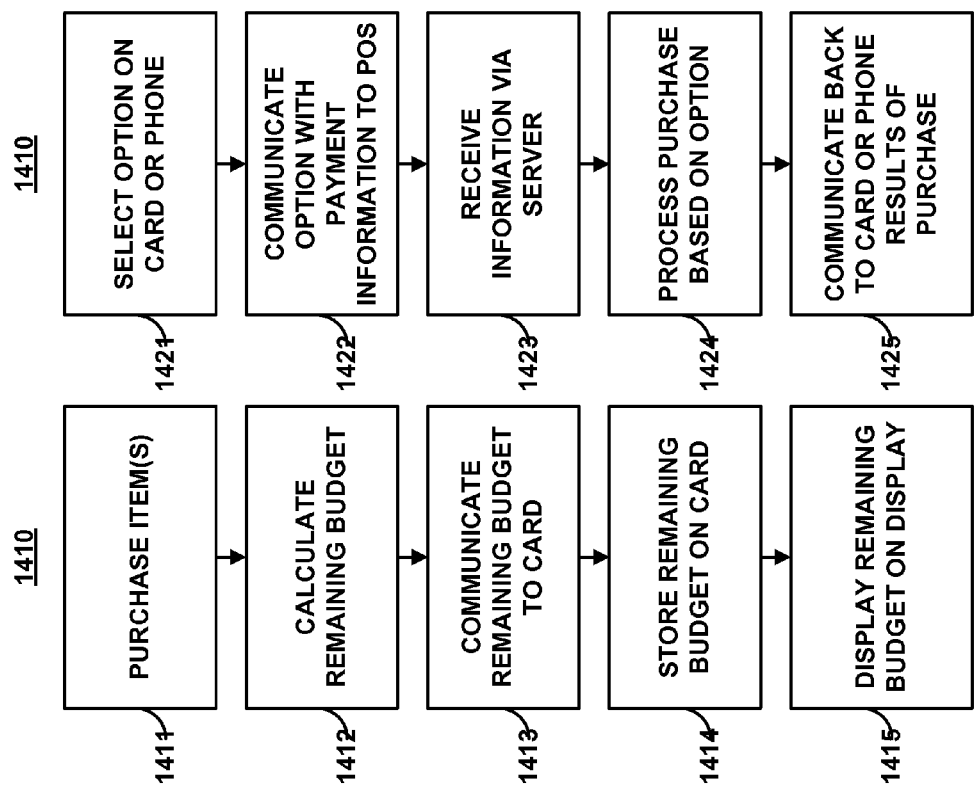
FIG. 14 is a flow chart of processes constructed in accordance with the principles of the present invention.

FIG. 14 shows flow chart 1410 that may include, for example, step 1411, in which items are purchased. A remote server may, for example, calculate a remaining budget based on the purchase in step 1412 and communicate (e.g., via light) this remaining budget to a card or other device (e.g., phone) in 1413. The remaining budget may be stored on a card in step 1414 and displayed on the card, via a display, in step 1415. Flow chart 1420 is included and may include step 1421 in which an option is selected on a card or phone. Such an option may be, for example, an option to change spending rules for a particular payment account (e.g., a points or credit account). Step 1422 may be included in which this option is communicated with payment information to a point of sale device (e.g., a magnetic stripe reader or RFID reader). Step 1423 may be included in which the information is received by one or more servers. A purchase may then be processed in step 1424 based on this option. The results of the purchase and/or the option may be communicated back in step 1425. For example, both a card and a phone may include circuitry for receiving cell phone signals. Accordingly, each device may receive an SMS text message indicative of the results of the purchase (e.g., a receipt) and an option (e.g., whether it was properly implemented). Such a message may be displayed on a display of the card or phone. For example, an option to pay for an option with points if points are available may return with a message that a partial amount of the purchase was paid for with points and a different amount of the purchase was paid for with credit. A fee may be included for the user if the split between points and credit was made because the user did not have the point balance required to pay for the purchase with points.

Persons skilled in the art will appreciate that a budget card may be utilized for accounting and expense management benefits. Particularly, a cardholder may manage his/her own spending. A cardholder may be provided with the ability to set an amount of spending for particular spend categories (e.g., groceries, clothing, entertainment). A cardholder may, after each transaction, enter in the category of the expense (e.g., grocery, clothing, and entertainment) and the amount of money the user spent. The card can then calculate the amount left in a user's spending allocation for each category and display this information to the user. Accordingly, the balance of each expense category may be stored on card such that a user can keep personal track of his/her finances using the card. Such information may be communicated to a server whenever a purchase is made. This communicated information may be utilized to provide the user with an online GUI that tracks a user's expenses based on input received from a cardholder on the card. A cardholder may be provided with a messaging service (e.g., SMS notifications and alerts) for free or at an additional cost. The cardholder can then select, for example, spending thresholds for different categories. The user can be sent SMS messages indicating to the user the exact amount spent. The user may utilize this information at his/her convenience to enter it into a card. Alternatively, for example, the device receiving the messages (e.g., the mobile device) can communicate the information to the card (e.g., via light pulses communicated from the display of the device). Similarly, a cardholder may receive an alert via other device message services (e.g., SMS messages on a mobile device) when a remaining budget for a cardholder is exhausted or falls below a certain pre-determined threshold. Such pre-determined thresholds for alerts may be defined by the user or may be a pre-defined percentage or amount (e.g., 10% of the budget left or $100 left). Similarly, a card may alert a user when a budget is close to exhaustion. Such an alert may take the form of, for example, alert information being displayed on the display of a card. A remote authentication system for purchases may also communicate information regarding the remaining budget to a point-of-sale device such that the point-of-sale device can print this information on a receipt (e.g., or communicate the information to a card via light pulses on a display).

Persons skilled in the art will also appreciate that the present invention is not limited to only the embodiments described. Instead, the present invention more generally involves dynamic information. Persons skilled in the art will also appreciate that the apparatus of the present invention may be implemented in other ways then those described herein. All such modifications are within the scope of the present invention, which is limited only by the claims that follow.

What is claimed is:

1. A payment card comprising:
   a display;
   a battery; and
   an array of manual input interfaces,
   wherein said array of manual input interfaces is operable to receive a budget amount and expiration date, and
   said card is operable to communicate said budget amount and said expiration date via a dynamic magnetic stripe communications device.

2. The payment card of claim 1, further comprising a second display.

3. The payment card of claim 1, wherein said dynamic magnetic stripe communications device comprises a magnetic emulator.

4. The payment card of claim 1, wherein said dynamic magnetic stripe communications device comprises a magnetic encoder.

5. The payment card of claim 1, wherein said display is operable to display multiple lines of information.

6. The payment card of claim 1, further comprising a processor.

7. The payment card of claim 1, further comprising an RFID.

8. The payment card of claim 1, further comprising an exposed IC chip.

9. The payment card of claim 1, wherein said card is operable to communicate a payment account number via said dynamic magnetic stripe communications device with said budget amount and said expiration date.

10. The payment card of claim 1, wherein said array of manual input interfaces is operable to receive an unlocking code, and
    said card is operable to verify said unlocking code before said budget amount and said expiration date is communicated.

11. The payment card of claim 1, further comprising a plurality of magnetic stripe reader read-head detectors.

12. The payment card of claim 1, further comprising a first surface, wherein said display is viewable from said first surface and said display represents at least 50% of said first surface when viewed.

13. The payment card of claim 1, further comprising a source of light.

14. The payment card of claim 1, further comprising a light sensor.

15. The payment card of claim 1, further comprising a source of light and a light sensor.

* * * * *